United States Patent
Giovangrossi et al.

(10) Patent No.: US 9,010,682 B2
(45) Date of Patent: Apr. 21, 2015

(54) METHOD AND SYSTEM FOR EMERGENCY LANDING OF A VEHICLE

(75) Inventors: Giacomo Giovangrossi, Aprilia (IT); Pasquale Monteleone, Aprilia (IT)

(73) Assignee: Aero Sekur S.p.A., Aprilia (LT) (IT)

( * ) Notice: Subject to any disclaimer, the term of this patent is extended or adjusted under 35 U.S.C. 154(b) by 292 days.

(21) Appl. No.: 13/808,173

(22) PCT Filed: Jun. 27, 2011

(86) PCT No.: PCT/IT2011/000220
§ 371 (c)(1),
(2), (4) Date: Aug. 7, 2013

(87) PCT Pub. No.: WO2012/004820
PCT Pub. Date: Jan. 12, 2012

(65) Prior Publication Data
US 2014/0124620 A1    May 8, 2014

(30) Foreign Application Priority Data

Jul. 7, 2010   (IT) .............................. RM2010A0366

(51) Int. Cl.
*B64C 25/56* (2006.01)
*B64D 25/00* (2006.01)
*B64C 25/32* (2006.01)

(52) U.S. Cl.
CPC ........... *B64C 25/56* (2013.01); *B64C 2025/325* (2013.01); *B64D 25/00* (2013.01); *B64D 2201/00* (2013.01)

(58) Field of Classification Search
USPC ............................................ 244/121, 100 A
See application file for complete search history.

(56) References Cited

U.S. PATENT DOCUMENTS

| | | | | |
|---|---|---|---|---|
| 5,259,574 A | * | 11/1993 | Carrot | 244/100 A |
| 5,556,056 A | * | 9/1996 | Kalberer et al. | 244/121 |
| 5,560,568 A | * | 10/1996 | Schmittle | 244/48 |
| 5,610,575 A | * | 3/1997 | Gioutsos | 340/429 |
| 5,765,778 A | * | 6/1998 | Otsuka | 244/101 |
| 5,779,264 A | * | 7/1998 | de Mersseman et al. | 280/735 |
| 5,835,007 A | * | 11/1998 | Kosiak | 340/436 |

(Continued)

FOREIGN PATENT DOCUMENTS

| | | |
|---|---|---|
| EP | 0869058 | 3/1998 |
| WO | 2009/054844 | 4/2009 |

OTHER PUBLICATIONS

PCT International Search Report mailed on Sep. 28, 2011 for PCT Application PCT/IT2011/000220 filed on Jun. 27, 2011 in the name of Aero Sekur S.P.A.

(Continued)

*Primary Examiner* — Justin Benedik
(74) *Attorney, Agent, or Firm* — Steinfl & Bruno LLP

(57) ABSTRACT

A method for emergency landing of a vehicle, such as a helicopter or like, is described. The vehicle has at least one airbag provided with a respective opening valve for allowing the outflow of the gas therein contained. The airbag is suitable to cushion the impact of the vehicle with ground, and is inflated for an emergency landing. The method checks the conditions for the emergency landing of the vehicle, detects the maximum or impact speed of the vehicle, and opens the opening valve after the detection of an activation speed of the vehicle, so as to deflate the airbag. A system for controlling airbags of a vehicle, such as a helicopter or like, is also described.

18 Claims, 3 Drawing Sheets

(56) References Cited

U.S. PATENT DOCUMENTS

Figure 1:
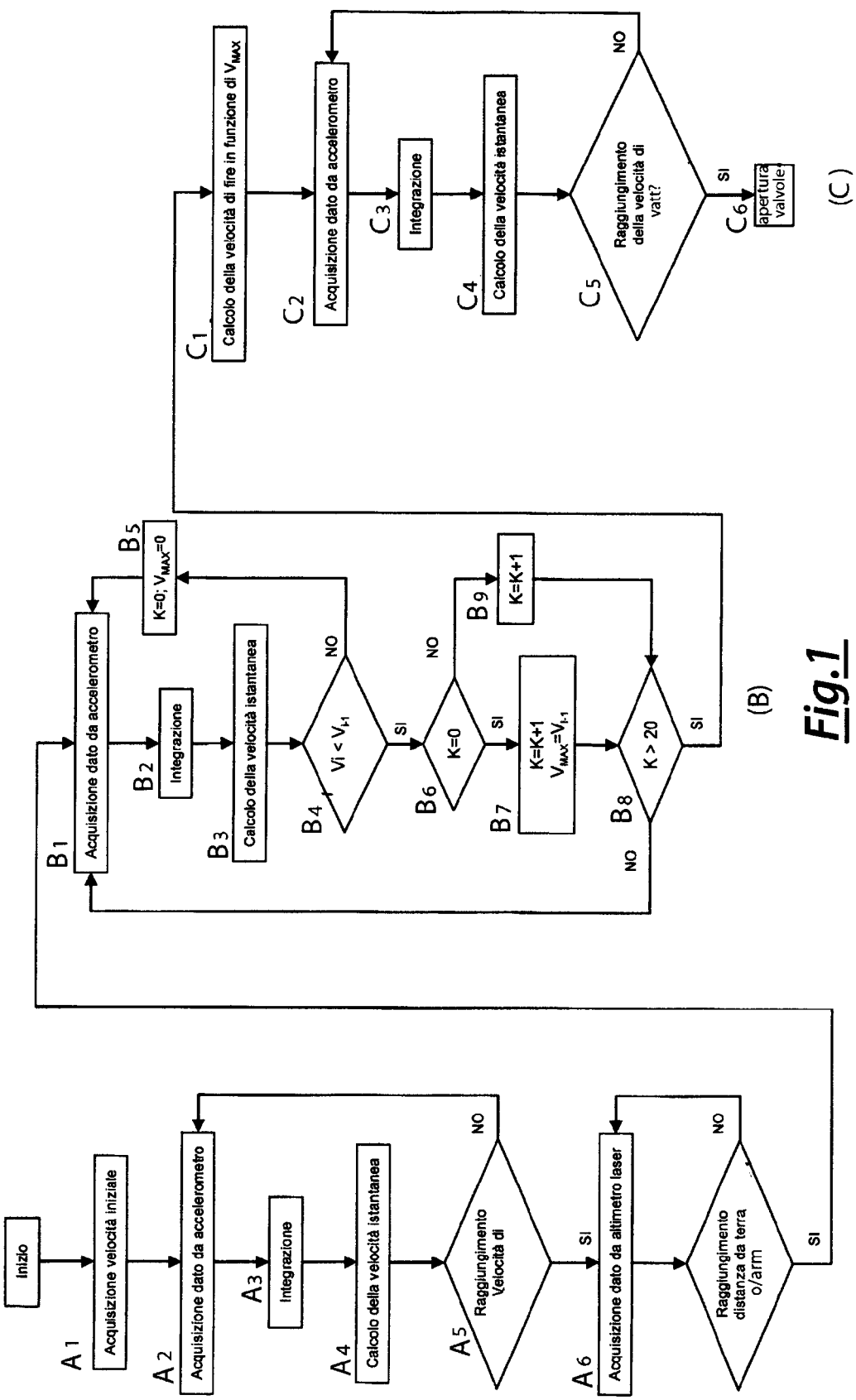

| | | | |
|---|---|---|---|
| 5,928,300 A * | 7/1999 | Rogers et al. | 701/45 |
| 5,992,794 A * | 11/1999 | Rotman et al. | 244/17.17 |
| 6,028,505 A * | 2/2000 | Drori | 340/426.17 |
| 6,170,864 B1 * | 1/2001 | Fujita et al. | 280/735 |
| 6,259,379 B1 * | 7/2001 | Paterson et al. | 340/970 |
| 6,338,456 B1 * | 1/2002 | Cairo-Iocco et al. | 244/139 |
| 6,749,218 B2 * | 6/2004 | Breed | 280/735 |
| 2001/0019089 A1 * | 9/2001 | Happ | 244/122 AG |
| 2005/0230545 A1 * | 10/2005 | Ayoub | 244/122 A |
| 2010/0044507 A1 * | 2/2010 | Smith et al. | 244/110 R |
| 2010/0094508 A1 * | 4/2010 | Kozyreff et al. | 701/45 |
| 2010/0206983 A1 * | 8/2010 | Tho et al. | 244/100 A |
| 2011/0204181 A1 * | 8/2011 | Hill et al. | 244/100 A |
| 2011/0226898 A1 * | 9/2011 | Smith et al. | 244/100 A |

OTHER PUBLICATIONS

PCT International Preliminary Report on Patentability mailed on Sep. 4, 2012 for PCT Application PCT/IT2011/000220 filed on Jun. 27, 2011 in the name of Aero Sekur S.P.A.

Response filed on Aug. 6, 2012 to PCT International Preliminary Report on Patentability for PCT Application PCT/IT2011/000220 filed on Jun. 27, 2011 in the name of Aero Sekur S.P.A.

* cited by examiner

METHOD AND SYSTEM FOR EMERGENCY LANDING OF A VEHICLE

CROSS REFERENCE TO RELATED APPLICATIONS

The present application is the US national stage of International Application PCT/IT2011/000220 filed on Jun. 27, 2011 which, in turn, claims priority to Italian Application RM2010A000366 filed on Jul. 7, 2010.

The present invention relates to a method and a system for emergency landing of a vehicle, such as a helicopter or like.

More specifically, the invention concerns a method and a related system to release the gas contained in one or more airbags, to allow a safety and without risks land of a helicopter.

As it is well known, in some cases of emergency, situations may occur, in which a helicopter is forced to land with high speed components and pitch and roll angles different with respect nominal conditions, according to which the vehicle was designed. Under these conditions, the landing could also be fatal for the driver and passengers of the helicopter or, in any case, fatal for the main structure.

In order to minimize the risk of mortality, impact attenuation systems are used. One of such system is the one that uses the technology of the so called "Vented airbags". In such systems, the energy absorbed by plastic deformation of the fuselage would not be able to reduce the acceleration to a sustainable level for the human body. Therefore, the kinetic energy of the helicopter is converted into compression energy of the gas that inflates the protection airbags of the helicopter. This gas is released into the atmosphere at the right time. The gas compression velocity defines, therefore, the maximum level of deceleration at which the helicopter will be subject, during the impact with the ground.

A drawback of these systems is that they are not able to determine the exact moment when the gas contained in the helicopter protection airbags has to be released, so as to minimize the effect of the impact of the helicopter with the ground.

Consider, in fact, that in case of the system is activated too early, the helicopter would impact the ground when the airbags are substantially deflated and, therefore, the fuselage would be subject to strong impact; instead, in the case of the system is activated too late, the helicopter would impact the ground with the gas contained in the airbags at high-pressure, and this would cause the helicopter itself to rollover, even in this case with great risk for passengers and driver.

In view of the above, it is an object of the present invention to provide a method, i.e. the logic, and relative system, for controlling the helicopter airbags gas release, capable of solving the above problems.

These and other results are obtained with a control system and a method according to the invention that allow the calculation of the appropriate moment to open the release valves of the gas contained in the airbags of a vehicle, such as a helicopter or the like, so as to cushion the impact with the ground, avoiding a rollover.

It is therefore a specific object of the invention a method for emergency landing of a vehicle, such as an helicopter or like, said vehicle comprising at least one airbag provided with a respective opening valve for allowing the outflow of the gas therein contained, said at least one airbag being suitable to cushion the impact of said vehicle with the ground, said at least one airbag being inflated for an emergency landing, said method comprising the following steps: (A) checking the conditions for the emergency landing of said vehicle; (B) detecting the maximum or impact speed of the vehicle; and (C) opening said opening valve after the detection of an activation speed of the vehicle, so as to deflating said at least one airbag.

Always according to the invention, said vehicle could comprise a plurality of airbags.

Still according to the invention, said detection step of the maximum or impact speed could comprise the following sub-steps: acquiring the instantaneous speed near each airbag; and computing the maximum or impact speed near each airbag.

Further according to the invention, said computing step of the maximum or impact speed could comprise the following sub-steps: detecting the reduction of the instantaneous speed for a consecutive number of samples; and setting the maximum or impact speed equal to the instantaneous speed detected by the first sample, after which the number of reducing samples of instantaneous speed have been detected, preferably said number of samples could be equal to 20.

Advantageously according to the invention, said opening step could comprise the following sub-steps: detecting the instantaneous speed near each airbag; and opening the opening valve of the relevant airbag when said instantaneous speed reaches an activation speed.

Always according to the invention, said activation speed could be a function of said maximum or impact speed, in particular said activation speed could be a linear function and it is preferably equal to the product of said maximum or impact speed and a coefficient equal to about 0.35.

Still according to the invention, said checking step could comprise the following steps: acquiring the instantaneous speed near each airbag; checking whether said instantaneous speed reach an emergency landing procedure speed; detecting the distance of said vehicle from the ground; checking whether said distance is less or equal than a distance for emergency landing of said vehicle, said distance being preferably of about 2.5 meters.

Further according to the invention, in detecting instantaneous speed, the vertical component of the instantaneous speed could be detected.

Advantageously according to the invention, the detecting steps of the instantaneous speed near each airbag could comprise the following sub-steps: detecting the instantaneous acceleration near each airbag at a sampling frequency; integrating said acceleration samples acquired in the preceding detection step; computing the samples of instantaneous speed near each airbag.

Preferably according to the invention, said sampling frequency could be equal to about 1 KHz.

It is a further object of the invention a system for controlling airbags of a vehicle, such a san helicopter or like, comprising one or more speed detectors, each one installed on said vehicle, one or more airbag, each one arranged near a relevant speed detector, suitable to cushion the impact of said vehicle with the ground, each one of said airbag comprising a valve for releasing the contained gas, means for inflating said one or more airbags and a control central unit operatively connected with said one or more speed detectors, with said opening valves of said one or more airbags and with said means for inflating said one or more airbags.

Always according to the invention, said system could comprise a plurality of airbags, and in that it could comprise a number of speed detectors corresponding to the number of said airbags, each speed detector comprising an accelerometer, and said control central unit being suitable to integrate the accelerations detected by each one of said accelerometers, so as to obtain the instantaneous speed of the vehicle portion wherein said accelerometer is installed.

Still according to the invention, said system could comprise an altitude detector, such a laser altimeter, connected with said control central unit, suitable to detect the height of said vehicle from the ground.

Further according to the invention, said control central unit could be suitable to execute the method for emergency landing as described above.

Always according to the invention, said valves could be pyrotechnic activation valves.

The present invention will be now described, for illustrative but not limitative purposes, according to its preferred embodiments, with particular reference to the figures of the enclosed drawings, wherein:

FIG. 1 shows the procedure by which the gas of the airbags of a helicopter is released; and FIGS. 2a-2f show a sequence of gas release of the airbags in a helicopter that crashes to the ground.

Referring to FIG. 1, it is shown the procedure to control a system to release the gas contained in the airbags of a helicopter.

The gas release control system comprises a central control unit, a plurality of accelerometers, each connected to, and controlled by, said central unit. In particular, an accelerometer for each airbag of the helicopter provided. Each of said accelerometers is placed on the rigid structure of the helicopter in order to minimize the presence of interferences in the acquisition of the acceleration. Moreover, the position of said accelerometers, and therefore also of the airbags, will be defined to detect the vehicle trim while the helicopter crashes, to avoid excessive angular accelerations, which could result in a rollover of the helicopter, after the impact with the ground. The system also includes a laser altimeter, for the detection of the distance of the vehicle from the ground.

Said accelerometers are used to determine the instantaneous speed of the different parts of the helicopter, in which they are installed. This speed is achieved through a step-by-step integration of the detected accelerations, once the initial speed of the vehicle is known. The algorithm in this embodiment for the control, takes into account only the vertical component of acceleration, which is measured in the local coordinate system.

In the system under consideration, each airbag is provided with a pyrotechnic actuated valve, operatively connected with said central control unit, so that said unit can activate the opening. Each valve, once activated, releases the gas contained in the respective airbag on which it is installed.

The method for releasing the gas contained in airbags in a helicopter can be divided into three main steps, which start from a starting signal of the emergency procedure. Said signal is generated manually by the driver of the helicopter or vehicle in general, or by means of any automated system.

In general, the method for emergency landing according to the present invention provides for the airbag deployment after the start of the emergency procedure, i.e. after said start signal, the detection of the maximum value of the vertical speed of the helicopter, which is reached immediately after the impact with the ground of the helicopter itself, and the evaluation of an appropriate speed at which the valves of airbags are opened to deflate, in order to cushion the impact and to prevent a rollover.

However, consider that, even at the beginning of the emergency procedure, helicopter driver maneuvers may be done that could simulate the impact, by revealing a sudden slowing of the vehicle in flight. An incorrect assessment of the detection of the maximum speed in flight, interpreting it as an impact with the ground, could involve the opening of the valves in flight.

Therefore, following said start signal, after which the airbags are opened, a first check step of the conditions for starting the procedure for emergency landing of said vehicle and the control of airbags is provided, said step being indicated by (A). The result of said step (A) is to detect both the reaching of a minimum speed $V_{Arm}$, at which the safety procedure is started, and the reaching of a minimum distance of the vehicle from the ground, to check that said vehicle is effectively close to the ground.

This step (A) comprises the following substeps. In step (A1) the central unit detects the initial speed of the vehicle. Subsequently, in substep (A2) the central unit detects the different accelerations acquired by the accelerometers at a sampling frequency, which, in this embodiment, is 1 kHz.

In substep (A3) the acceleration acquired by the accelerometers are integrated, in order to get the instantaneous speed of the vehicle at any instant of time (step (A4)), generically indicated by $V_i$.

Subsequently, the central control unit executes a test substep (A5), to check if the vehicle has reached the speed $V_{Arm}$. In this embodiment said speed $V_{Arm}$ is preferably comprised between 2 m/s and 6 m/s.

If the central control unit detects that the vehicle has not reached said speed $V_{Arm}$, then it returns to execute the substep (A2), or it passes to a new test in step (A6), in which the central control unit detects the distance of the vehicle from the ground using a laser altimeter (not shown in the figures). If the helicopter has reached the distance $d_{Arm}$ that in this embodiment is approximately 2.5 meters, then the system detects that the helicopter is effectively crashing and is close to the ground. The control unit then passes to step (B) of the method according to the invention.

In said step (B) the impact maximum speed $V_{Max}$ of each part of the vehicle, in which an accelerometer is installed, is detected. In this way, the central control unit can detect that the vehicle has had an impact with the ground, because of the sudden deceleration, detected by the accelerometers. This allows calculating and then setting of the activation speed $V_{Att}$, for each airbag of the system, at which the respective valve is opened and the gas contained is released.

The detection of the maximum speed $V_{Max}$ is based on the fact that during the impact with the ground, the helicopter begins to decelerate and, therefore, the vehicle speed decreases.

In particular, in substep (B1) the acquisition of the detections from each accelerometer occurs, which are integrated in the substep (B2) to obtain the instantaneous speeds (step (B3)).

The instantaneous speed $V_i$ achieved from the integration of the accelerations detected by each accelerometer is compared with the instantaneous speed of the previous sample i−1.

For a definition of the maximum speed, the following condition has to be satisfied:

$$V_i(t) < V_i(t-1)$$

namely, the speed of the current passage (i) is less than the speed acquired in the previous passage (passage i−1). If the comparison $V_i(t) < V_i(t-1)$ is negative, then in substep (B5) are established:

$$K=0;$$

$$V_{Max}=0$$

where K is a counter, whose meaning will be better specified below, and $V_{Max}$ is the maximum speed of each accelerometer to be detected.

To detect the time of impact, the time when the vehicle begins to decelerate has to be detected. In addition, the vehicle, considering that it is landing or it is crashing, is subject to both to the acceleration of gravity, and, possibly, to that of the engine. Therefore, when the vehicle begins to decelerate at the same time even the speed of the vehicle will be detected. Of course, the higher maximum speed $V_{Max}$, than the most opportune time to open the airbag of each accelerometer will be different, in order to cushion the impact but to prevent the rollover of the vehicle. Therefore, the detection of the maximum speed allows, on the one hand, to have the vehicle impact force to the ground, and, on the other hand, to have the variable by which calculating the speed of the vehicle at which opening the valves to release the gas contained in airbags or in the sectors of airbags.

In case of $V_i(t)<V_i(t-1)$, it would therefore seem that the vehicle started to decelerate, indicating that the speed detected by the accelerometer in the previous sample, i.e. $V_i(t-1)$, is the maximum. However, whereas the maximum speed is detected by each accelerometer that is installed in a specific position of the vehicle, a single detection of decrease of speed over the previous instant could be a false signal, either for any detection errors or electronic errors, and as a result of variations in vehicle trim while landing or crashing. In fact, if the vehicle, such as a helicopter, changes its trim while crashing or it is subject to wide oscillations due to pitch or roll, some accelerometers detect an increase in speed, and other accelerometers, arranged in a different position of vehicle, detect, instead, a decrease in speed. This obviously implies a not correct detection.

Therefore, in order to make the system more robust, the condition $V_i(t)<V_i(t-1)$ must be checked for a minimum number of times (i.e. samples or passages) defined by the digital counter indicated above by K. In this embodiment, the acquisition of the maximum speed for the condition $V_i(t)<V_i(t-1)$ is repeated 20 times or passages. Of course, said counter K is incremented only when said condition is satisfied and the acquisition of speed $V_{Max}$ is carried out, only when said check $V_i(t)<V_i(t-1)$ is done for a consecutive number of times K.

If the condition for which the speed increases again should occur before K reaches the preset value, the counter K would again be reset to zero (step (B5)) and the cycle would resume in the beginning step (B1). Instead, if the condition Vi(t)<Vi(t-1) occurs more than 20 times (steps (B6)-(B9)), the maximum speed $V_{max}$ is considered detected, and it is possible to proceed to the next step (C).

In step (C1) the activation speed $V_{Att}$ for each accelerometer is defined, in which the central control unit opens the valve of the corresponding airbag or airbag sector.

Said activation speed $V_{Att}$ is a function of the maximum speed $V_{Max}$. In particular, in this embodiment, this function is linear, and is equal to: $V_{Att}=V_{Max}*0.35$.

In other words, considering a single accelerometer, when it detects an instantaneous speed $Vi=V_{Att}$, which, in this case, is equal to 35% of the maximum speed $V_{Max}$ detected, then the central control unit opens the valve of the respective airbag.

The integration of the accelerometers and then the calculation of the instantaneous speed will proceed in steps (C2), (C3) and (C4) until reaching the activation speed in test step (C5), in which the valve of the respective airbag will be opened, in step (C6), and the gas, in said airbag, released.

Figure 2A:
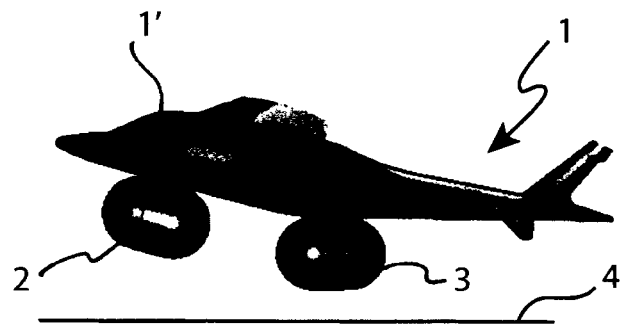

FIGS. 2a-2f show a sequence of gas release of the airbags in a helicopter that crashes to the ground. As can be seen, FIG. 2a shows a helicopter 1 crashing on the ground 4, equipped with a front airbag 2 and a rear airbag 3.

Airbags 2 and 3 are already inflated and ready to impact with the ground 4, to cushion the impact and to protect the people in the cabin 1' of the helicopter 1.

Before impact with the ground 4, the central control unit has already detected that the vehicle has reached the speed $V_{Arm}$ and, before the impact with the ground, it has detected the effective distance from the ground 4 by means of the laser altimeter.

Figure 2B:
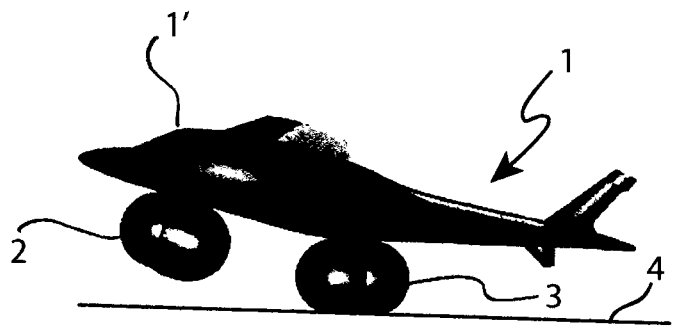

In FIG. 2b, rear airbag 3 comes into contact with the ground 4. In this case, the central control unit detects, by means of the accelerometer relative to said rear airbag 3, a reduction of speed and it is capable to provide the impact maximum speed $V_{Max-3}$ of the vehicle portion protected by airbag 3.

Figure 2C:
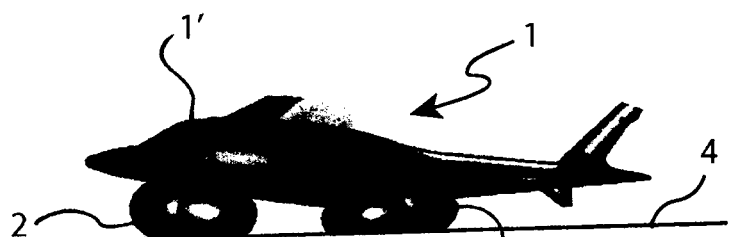

In FIG. 2c, even front airbag 2 comes into contact with the ground 4.

Figure 2D:
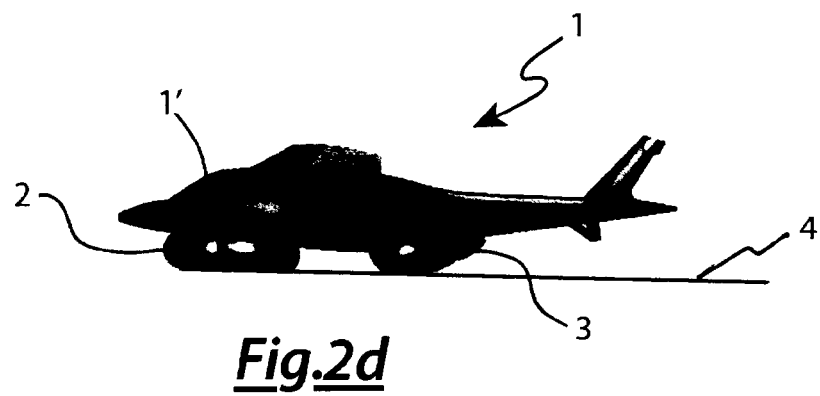

In FIG. 2d, the accelerometer of the rear airbag 3 has detected that activation speed $V_{Att-3}$ of the airbag 3 has been reached, which, in this embodiment, is equal to $V_{Max-3}*0.35$. At this point, central control unit opens the pyrotechnic actuated valve, deflating airbag 3.

Meanwhile, front airbag 2 comes into contact with the ground 4, and the central control unit detects a speed reduction, by the accelerometer relative to said front airbag 2, so as to obtain the maximum impact speed $V_{Max-2}$ of the vehicle portion protected by airbag 2.

Figure 2E:
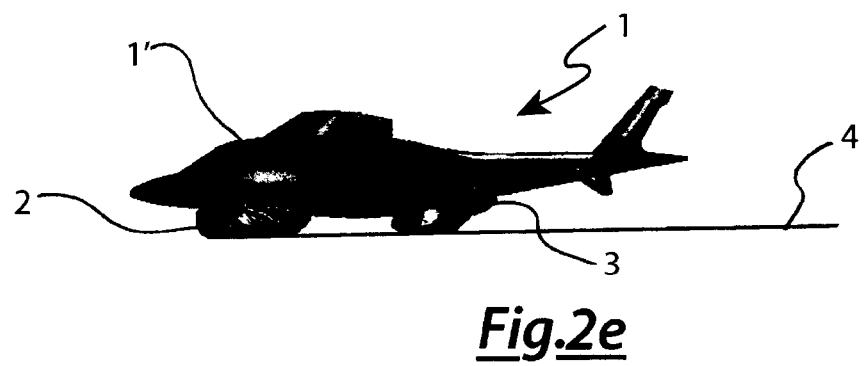

In FIG. 2e, the accelerometer of the front airbag 2 has detected that even activation speed $V_{Att-2}$ of the airbag 2 has been reached that, in this embodiment, is equal to $V_{Max-2}*0.35$. At this point, the central control unit opens the pyrotechnic actuated valve, deflating front airbag 2. Meanwhile, the rear airbag 3 continues to deflate, cushioning the impact of the helicopter 1 with ground 4.

Figure 2F:
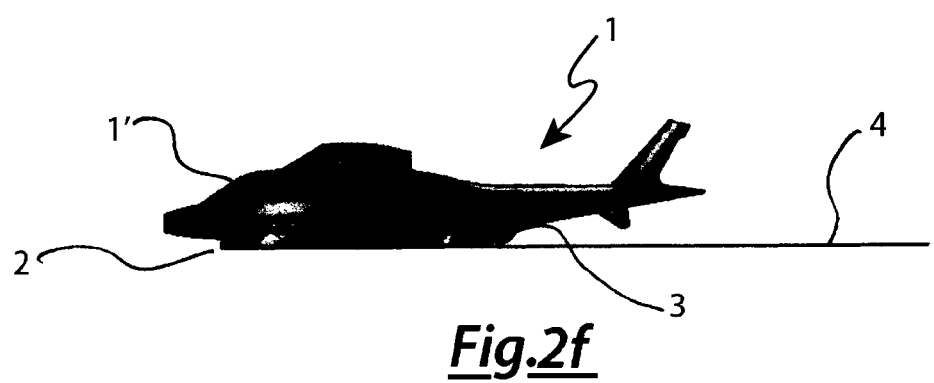

Finally, FIG. 2f shows the helicopter 1 arranged on the ground 4 with both front 2 and rear 3 airbags completely deflated.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. A method for emergency landing of a vehicle, said vehicle comprising at least one airbag provided with a respective opening valve for allowing an outflow of a gas therein contained, said at least one airbag being suitable to cushion an impact of said vehicle with ground, said at least one airbag being inflated for an emergency landing, said method comprising the following steps:
   checking conditions for the emergency landing of said vehicle;
   detecting a maximum speed or an impact speed ($V_{Max}$) of said vehicle; and
   opening said opening valve after detection of an activation speed ($V_{Att}$) of the vehicle to deflate said at least one airbag; wherein
   said vehicle comprises at least one airbags, and
   said opening step further comprises the following substeps:
   detecting an instantaneous speed (Vi) of different parts of the vehicle, in which the at least one airbag is installed; and
   opening said respective opening valve of the at least one airbag when said instantaneous speed ($V_i$) reaches an activation speed ($V_{Att}$).

2. The method according to claim 1, wherein said detecting step of the maximum speed or the impact speed ($V_{Max}$) comprises the following sub-steps:
   acquiring the instantaneous speed ($V_i$) of each of the at least one airbag; and
   computing the maximum speed or the impact speed ($V_{Max}$) of each of the at least one airbag.

3. The method according to claim 2, wherein said computing step of the maximum speed or the impact speed ($V_{Max}$) comprises the following sub-steps:
   detecting a reduction of the instantaneous speed (Vi) for a consecutive number (K) of samples; and
   setting the maximum speed or the impact speed ($V_{Max}$) equal to the instantaneous speed ($V_i$) detected by a first sample, after which a number (K) of reducing samples of instantaneous speed ($V_i$) have been detected.

4. The method according to claim 3, wherein said number (K) of reducing samples is equal to 20.

5. The method according to claim 1, wherein said activation speed ($V_{Att}$) is a function of said maximum speed or the impact speed ($V_{Max}$).

6. The method according to claim 5, wherein said activation speed ($V_{Att}$) is equal to a product of said maximum speed or the impact speed ($V_{Max}$) and a coefficient equal to about 0.35.

7. The method according to claim 5, wherein said activation speed ($V_{Att}$) is a linear function.

8. The method according to claim 1, wherein said checking step comprises the following steps:
   acquiring the instantaneous speed ($V_i$) of each of the at least one airbag;
   checking whether said instantaneous speed ($V_i$) reaches an emergency landing procedure speed ($V_{Arm}$);
   detecting a distance of said vehicle from the ground; and
   checking whether said distance is less or equal than a distance ($d_{Arm}$) for emergency landing of said vehicle.

9. The method according to claim 8, wherein said distance ($d_{Arm}$) is about 2.5 meters.

10. The method according to claim 1, wherein during said detecting said instantaneous speed ($V_i$), a vertical component of the instantaneous speed ($V_i$) is detected.

11. The method according to claim 1, wherein the detecting step of the instantaneous speed ($V_i$) of each of the at least one airbag comprises the following sub-steps:
   detecting an instantaneous acceleration of each of the at least one airbag at a sampling frequency;
   integrating instantaneous acceleration samples acquired in the preceding detecting step; and
   computing samples of instantaneous speed ($V_i$) of each of the at least one airbag.

12. The method according to claim 11, wherein said sampling frequency is equal to about 1 KHz.

13. A system for controlling airbags of a vehicle capable to run the method for emergency landing according to claim 1, comprising
   one or more speed detectors, each of the one or more speed detectors installed on said vehicle,
   one or more airbags, wherein each of the one or more airbags is arranged in different parts of the vehicle, in which one of the one or more speed detector is installed, is suitable to cushion an impact of said vehicle with the ground, and comprises an opening valve for releasing a contained gas,
   means for inflating said one or more airbags and
   a control central unit operatively connected with said one or more speed detectors, with said opening valves of said one or more airbags and with said means for inflating said one or more airbags, said control central unit is suitable to execute the method according to claim 1.

14. The system according to claim 13, comprising
   a plurality of airbags,
   a number of speed detectors corresponding to a number of said airbags, each speed detector comprising an accelerometer, and
   a control central unit being suitable to integrate accelerations detected by each one of said accelerometers, so as to obtain the instantaneous speed ($V_i$) of the vehicle wherein said accelerometer is installed.

15. The system according to claim 13, further comprising an altitude detector connected with said control central unit, suitable to detect a height of said vehicle from the ground.

16. The system according to claim 15, wherein said altitude detector is a laser altimeter.

17. The system according to claim 13, wherein said opening valves are pyrotechnic activation valves.

18. The system according to claim 13, wherein the vehicle is a helicopter.

* * * * *